Jan. 31, 1928.
J. HARRIS
1,657,886
DIRECT CURRENT METERING SYSTEM
Filed Jan. 24, 1925
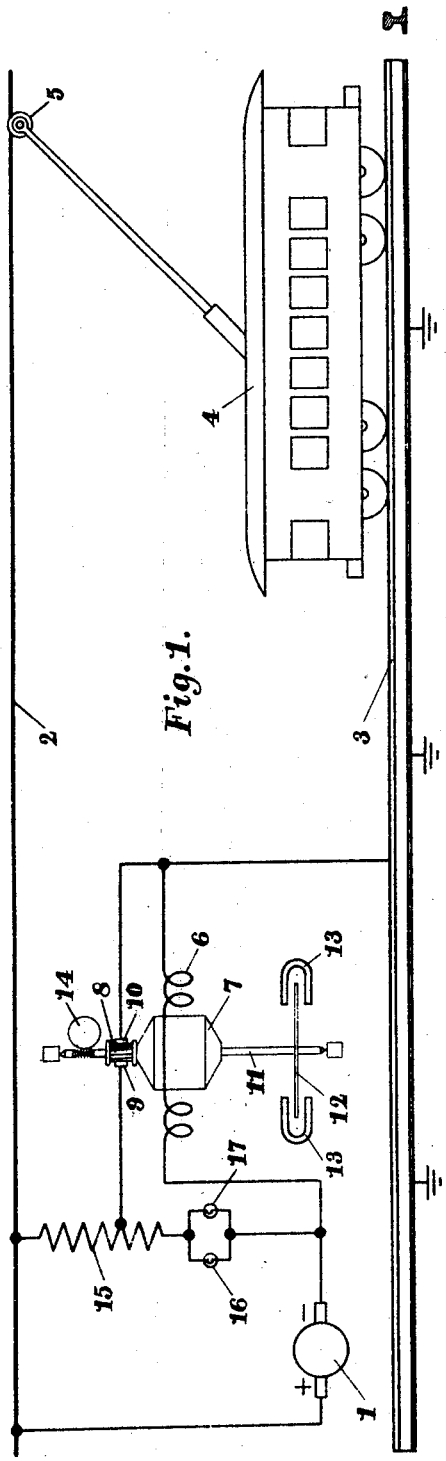
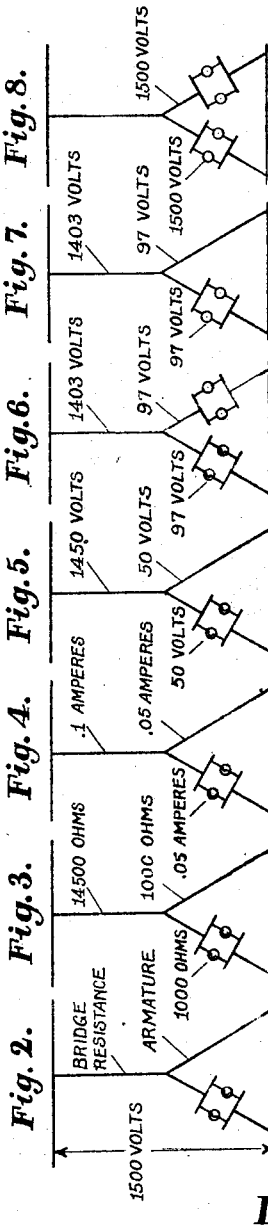
Inventor:
Jesse Harris
By
Attorney.

Patented Jan. 31, 1928.

1,657,886

UNITED STATES PATENT OFFICE.

JESSE HARRIS, OF LA FAYETTE, INDIANA, ASSIGNOR TO DUNCAN ELECTRIC MANUFACTURING COMPANY, OF LA FAYETTE, INDIANA, A CORPORATION OF ILLINOIS.

DIRECT-CURRENT-METERING SYSTEM.

Application filed January 24, 1925. Serial No. 4,389.

My invention relates to high potential direct electric current transmission systems having grounded negative sides, such as are employed in the operation of electric railway systems which are operated by direct current. The invention has for its object the provision of an improved metering system in conjunction with such a transmission system serving to determine the energy supplied by the direct current generator. The circuit arrangement of my invention enables the use of a one hundred and ten volt instrument in a very high potential system without the difficulties and hazards that ordinarily would be attendant upon the breakage of the pressure circuit of the instrument in testing.

The current field winding of the instrument is inserted between the negative terminal of the generator and ground, while the pressure field winding is included in shunt of a portion of a high resistance bridge that is inserted between the metallic and grounded sides of the line. The portion of the bridge thus shunted by the pressure element of the instrument is at the grounded end of the bridge, the pressure winding being then also grounded. A signaling device is preferably included in circuit between the sides of the transmission system, this signaling device being desirably in the high resistance bridge and also in the circuit portion that includes the pressure element of the instrument and the selected section of the high resistance bridge. This signaling device, which is preferably a lamp, serves, with the meter, to visually indicate the working condition of the meter and its connections with the system, making it unnecessary to perform dangerous tests for this purpose.

The invention will be more fully explained in connection with the accompanying drawing in which Fig. 1 illustrates a high potential direct current electric railway system employing the preferred metering circuit arrangement of my invention; and Figs. 2 to 8 inclusive illustrate the circuit conditions and electrical values at the meter.

In the system illustrated, the direct current generator 1 supplies current to a trolley wire 2 from the positive pole of the generator whose negative pole is grounded through the track 3 of the railway. The trolley car 4 employs a motor in gear with its driving vehicle wheels and placed in bridge of the transmission line through the instrumentality of a trolley 5 and the vehicle wheels of the car, in a manner well known.

The meter for determining the amount of energy supplied to the system is desirably located at the generating station. It is illustrated as a watt hour meter, though the invention is not to be limited to the kind of watt meter employed. The meter shown includes a current field winding 6 connected beween the negative pole of the generator 1 and the grounded track 3. The pressure field winding is included in the armature 7 that is supplied with a commutator 8 having commutator brushes 9 and 10. The armature is carried upon an upright spindle 11 that also carries a damping disc 12 which operates between two damping permanent magnets 13. The meter illustrated being a watt hour meter, its spindle is in gear with a totalizing train partially illustrated at 14. The brush 10 is grounded through the rail 3. The brush 9 is connected at a selected place between the terminals of a high resistance 15 which is connected between the metallic side 2 and the grounded side 3 of the transmission system, the armature of the meter being thus included in a circuit portion that includes the grounded section of the resistance 15 and the grounded commutator brush 10. Two indicators, preferably lamps 16, 17 are connected in parallel with each other, and preferably in said circuit portion, these lamps being desirably in the bridge with the resistance 15.

In the preferred embodiment of my invention and assuming a fifteen hundred volt direct current circuit, the pressure winding tap of the meter is taken from the resistance 15 at a fifty volt point from the ground whereby the meter may be operated on a very low voltage, which, however, is proportional to the voltage between the sides of the system.

The arrangement illustrated is one which will give the least difference of potential between the armature circuit and the frame of the meter.

For the same reason the field winding of the meter is connected between the ground and the negative terminal of the generator.

The safety and correct operation of the metering system depend upon the circuits thereof remaining intact, a condition which is automatically demonstrated by means of the small signal lamps 16, and 17, which also act, each, to determine the operativeness of the other by reason of their parallel relation. Figs. 2 and 8 inclusive are self-explanatory, these figures being drawn with the values heretofore assumed. The right side of the triangle shown in each figure corresponds to the pressure winding or armature of the meter, the left side of the triangle corresponds to the grounded section of the bridge resistance and the signal device in series therewith, and the base of the triangle corresponds to the grounded current winding of the meter. Fig. 2 illustrates the normal circuit condition; Fig. 3 the resistance values under normal circuit conditions; Fig. 4, current values that normally obtain; and Fig. 5 the pressure values that normally obtain. If the armature circuit of the meter is opened the voltage will be as indicated in Fig. 6, the lamps glowing with increased brilliancy to indicate this wrong condition of the circuit. If the left hand side of the triangle alone is opened, the pressure conditions are as illustrated in Fig. 7. If both the right and left hand sides of the triangle are opened, the pressure conditions are as illustrated in Fig. 8, but there will be no drop of potential in the portion of the high resistance bridge that remains connected with the metallic line because of the absence of current flow. If the bridge circuit is opened above the meter, the meter will be stopped and the lamps will be out, the meter and the lamps jointly indicating this condition of the bridge. If the armature circuit is alone open, the meter will be stopped while the lamps will glow with increased brilliancy, (Fig. 6), whereby this condition of the meter is indicated. If the bridge circuit be opened below the connection of the armature with the resistance 15 in this circuit, the meter will run but the lamps will be out. The observer will know that the equipment is in running order if both lamps normally glow while the meter is running. The apparatus of my invention makes it unnecessary to interrupt any of the circuit connections in order to test the accuracy of the running conditions of the meter, an advantage of peculiar importance in systems of high potential direct current distribution.

Having thus described my invention, I claim as new:

In a metering system employing a low voltage meter and a comparatively high voltage generator, the combination with a high voltage generator of direct electric current having a grounded negative pole; of a metallic transmission line connected with the positive pole of the generator; a high resistance bridge connected between said transmission line and ground; a low voltage watt meter having a current winding connected between the negative pole of the generator and ground and a pressure winding connected between an intermediate point of said bridge and ground; and indicating means in circuit between the negative pole of the generator and the place of connection of the pressure winding of the meter with said bridge.

In witness whereof, I hereunto subscribe my name.

JESSE HARRIS.